United States Patent
Duan et al.

(10) Patent No.: US 8,099,833 B2
(45) Date of Patent: Jan. 24, 2012

(54) WASHER FOR HINGE ASSEMBLY

(75) Inventors: Chao Duan, Shenzhen (CN); Chia-Hua Chen, Taipei (TW); Zhi-Yu Hu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 268 days.

(21) Appl. No.: 12/548,041

(22) Filed: Aug. 26, 2009

(65) Prior Publication Data

US 2010/0205778 A1   Aug. 19, 2010

(30) Foreign Application Priority Data

Feb. 17, 2009   (CN) .............................. 200920300665

(51) Int. Cl.
*E05D 11/08* (2006.01)

(52) U.S. Cl. ............................................ 16/337; 16/342

(58) Field of Classification Search .................... 16/337, 16/340, 342, 330, 303, 338, 273; 411/136, 411/149, 147, 160, 161, 531, 533, 150, 151; 361/679.21, 679.27, 679.3
See application file for complete search history.

(56) References Cited

U.S. PATENT DOCUMENTS

| | | | |
|---|---|---|---|
| 6,530,123 B1 * | 3/2003 | Wahlstedt | 16/342 |
| 6,600,632 B1 * | 7/2003 | Prochazka et al. | 360/264.1 |
| 6,705,813 B2 * | 3/2004 | Schwab | 411/526 |
| 7,929,285 B2 * | 4/2011 | Shen | 361/679.21 |
| 2003/0147723 A1 * | 8/2003 | Schwab | 411/526 |
| 2005/0177979 A1 * | 8/2005 | Duan et al. | 16/337 |
| 2006/0096063 A1 * | 5/2006 | Duan et al. | 16/303 |
| 2006/0242793 A1 * | 11/2006 | Tu et al. | 16/284 |
| 2007/0036350 A1 * | 2/2007 | Duan et al. | 379/433.13 |

* cited by examiner

*Primary Examiner* — Chuck Y. Mah
(74) *Attorney, Agent, or Firm* — Altis Law Group, Inc.

(57) ABSTRACT

A washer is for a hinge assembly. The hinge assembly includes a shaft. The washer is placed around the shaft. The engagement between the washer and the shaft is a clearance fit. By the clearance engagement between the washer and the main shaft, the mechanism efficiency is greatly improved.

2 Claims, 4 Drawing Sheets

WASHER FOR HINGE ASSEMBLY

BACKGROUND

1. Technical Field

The present disclosure relates to washers, and particularly to washers for hinge assemblies for foldable electronic devices, such as mobile phones and portable computers.

2. Description of Related Art

Presently, perhaps the most popular portable electronic device in the marketplace is the foldable mobile phone, which generally includes a cover section and a body section. The cover section and the body section are rotatably interconnected through a hinge assembly, for switching the mobile phone between an in-use position and a closed position.

A typical hinge assembly used in small foldable electronic devices includes a shaft, a cam, a follower, a spring, a sleeve and an E-shape washer. The sleeve has a partially-closed end and an open end. The cam and the spring are placed on the shaft, and are received in the sleeve. The E-shape washer is locked at one end of the shaft, and resists the outside of the partially-closed end of the sleeve. The follower is partially received in the sleeve from the open end, and is secured on the other end of the shaft.

Accordingly, the hinge assembly is completely assembled.

However, when the sleeve rotates relative to the shaft, a large friction torque is produced between the E-shape washer and the sleeve. This will reduce mechanical efficiency. In addition, when the E-shape washer is locked on the shaft, a point contact is formed therebetween. The contact area is small, thus more abrasion may be produced.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present washer. Moreover, in the drawings, like reference numerals designate corresponding parts throughout the several views, in which.

DETAILED DESCRIPTION

The present washer is suitable for a hinge assembly for foldable electronic device such as a foldable mobile phone. It is to be understood, however, that the hinge assembly could be advantageously used in other environments (e.g. cabinet doors).

Figure 1:
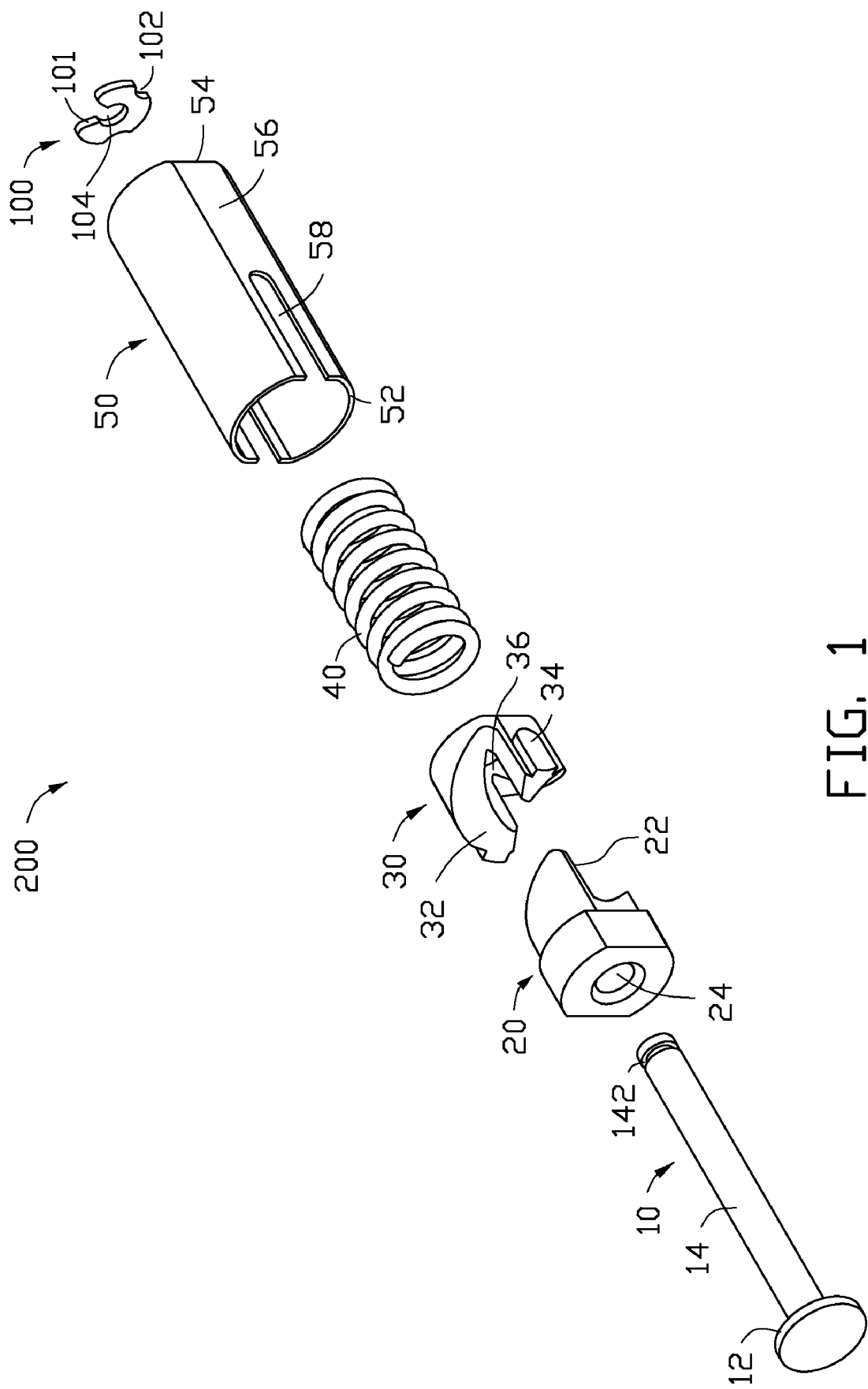
FIG. 1 is an exploded, isometric view of an exemplary hinge assembly.
Figure 2:
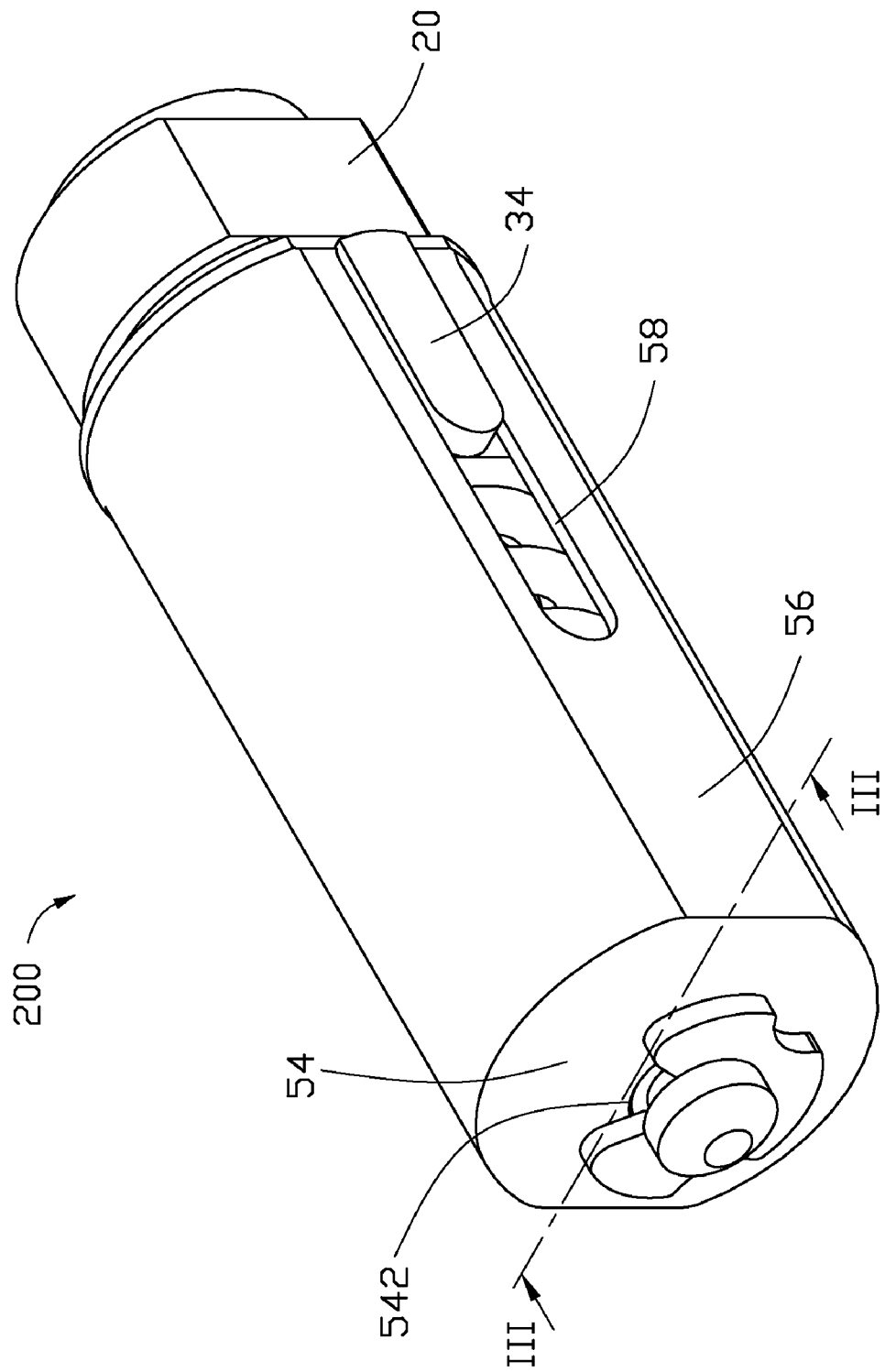
FIG. 2 is an assembled, isometric view of the exemplary hinge assembly shown in FIG. 1.

Referring to FIGS. 1 and 2, an exemplary hinge assembly 200 includes a main shaft 10, a follower 20, a rotary element 30, an elastic element 40, a sleeve 50, and a washer 100.

The main shaft 10 coaxially includes a flange portion 12 and a shaft portion 14. The flange portion 12 is formed at an end of the main shaft 10. The shaft portion 14 extends from a side of the flange portion 12. A diameter of the shaft portion 14 is smaller than the diameter of the flange portion 12. A free end of the shaft portion 14 defines a ring groove 142.

The follower 20 is for connecting with a body section (not shown). The follower 20 forms a cam surface 22 at one end thereof. The follower 20 defines a passage 24 for receiving the shaft portion 14.

The rotary element 30 has a latching cam surface 32 for engaging with the cam surface 22 of the follower 20. Two projections 34 are symmetrically formed on an outer periphery of the rotary element 30 extending from one end. A through hole 36 is longitudinally defined in the rotary element 30.

The elastic element 40 is preferably made of metal and is spiral-shaped (i.e. a coil spring). An inner diameter of the elastic element 40 is slightly larger than a diameter of the shaft portion 14 so the elastic element 40 can be placed around the main shaft 10.

The sleeve 50 is substantially a hollow cylinder. The sleeve 50 includes an open end 52 and a partially-closed end 54. The partially-closed end 54 has a central hole 542. The sleeve 50 forms two symmetric flat surface portions 56 along an outer peripheral wall thereof. The flat surface portions 56 extend from the partially-closed end 54. A guide groove 58 is defined in the flat surface portions 56. The projections 34 of the rotary element 30 are slidably engaged in the guide grooves 19. The flat surface portions 56 are configured for engaging with a cover section (not shown).

The washer 100 is made of metal, and is placed on the main shaft 10. The washer 100 defines an opening 101 and a C-shape hole 104. The opening 101 communicates with the outside of the washer 100 and the C-shape hole 104. The washer 100 symmetrically defines two notches 102 at a peripheral edge thereof to allow the washer 60 to stretch. In this exemplary embodiment, the washer 100 is engaged in the ring groove 142.

Figure 3:
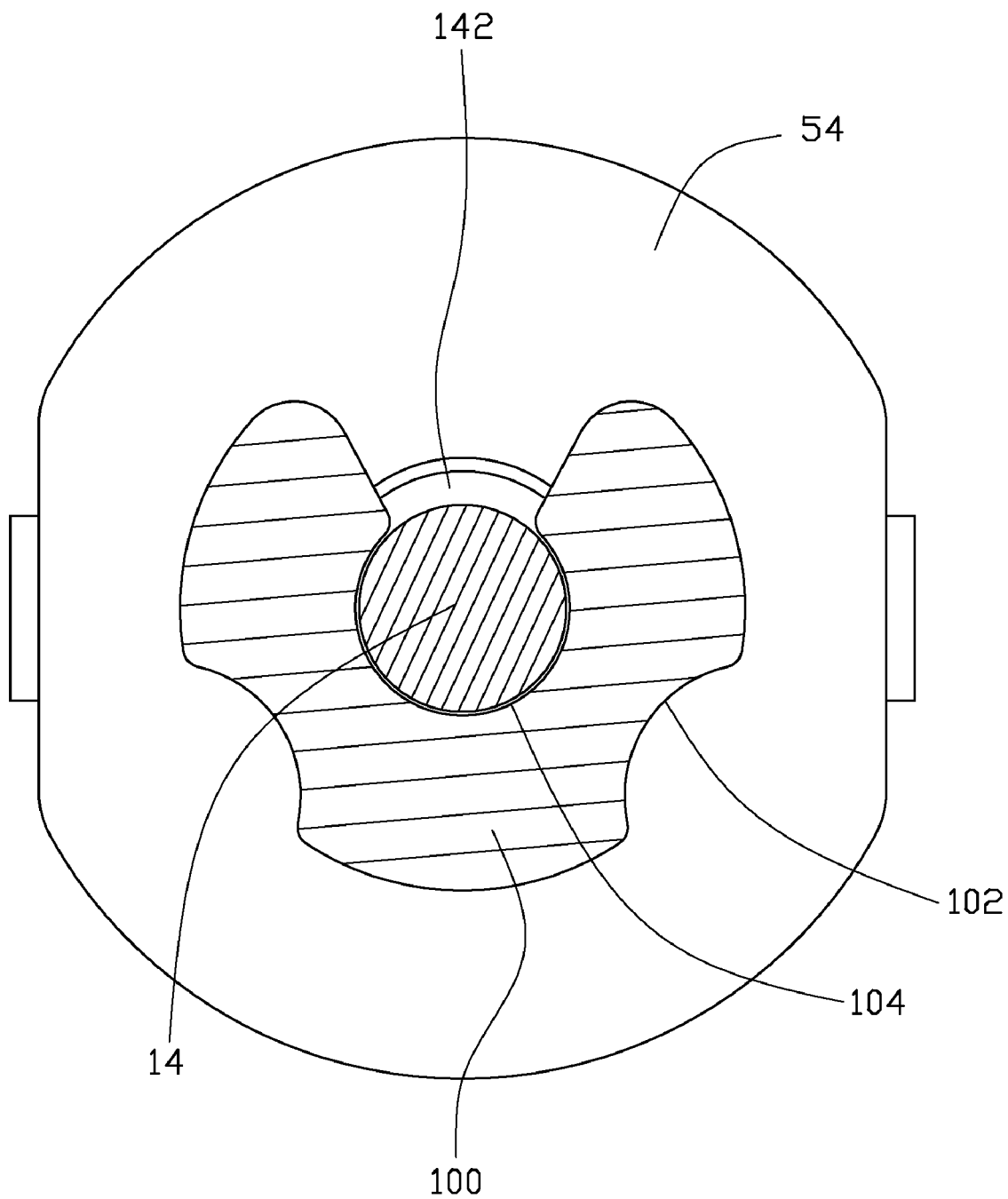
FIG. 3 is a cross-sectional view of FIG. 2 along II-II line.

During assembly of the hinge assembly 200, the follower 20 is placed on the mains shaft 10, and resists the flange portion 12 of the main shaft 10. Then, the rotary element 30, the elastic element 40 and the sleeve 50 are placed around the main shaft 10, in the order written. The cam surface 22 engages with the latching cam surface 32. The protrusions 34 are received in the guide grooves 58. One end of the elastic element 40 resists the rotary element 30, the other end of the elastic element 40 resists the partially-closed end 54 of the sleeve 50. One free end of the main shaft 10 passes through the central hole 542. The washer 100 is engaged in the ring groove 142, thereby securing the above elements on the main shaft 10. The compact hinge assembly 200 is completely assembled. Referring to FIG. 3, the engagement relationship between the washer 100 and the sleeve 50 is a clearance fit. When the sleeve 50 rotates relative to the main shaft 10, friction torque between the washer 100 and the main shaft 10 is smaller than the friction torque between the washer 100 and the sleeve 50. Therefore, the washer 100 will rotate relative to the main shaft 10, thereby increasing the mechanism efficiency.

By the clearance engagement between the exemplary washer 100 and the main shaft 10, the mechanism efficiency is greatly improved. In addition, a central area of the washer 100 with the main shaft 10 has a larger contact area so that the washer 100 is not easily abraded compared to the E-shape washer, thereby the stability of the hinge assembly is improved.

Figure 4:
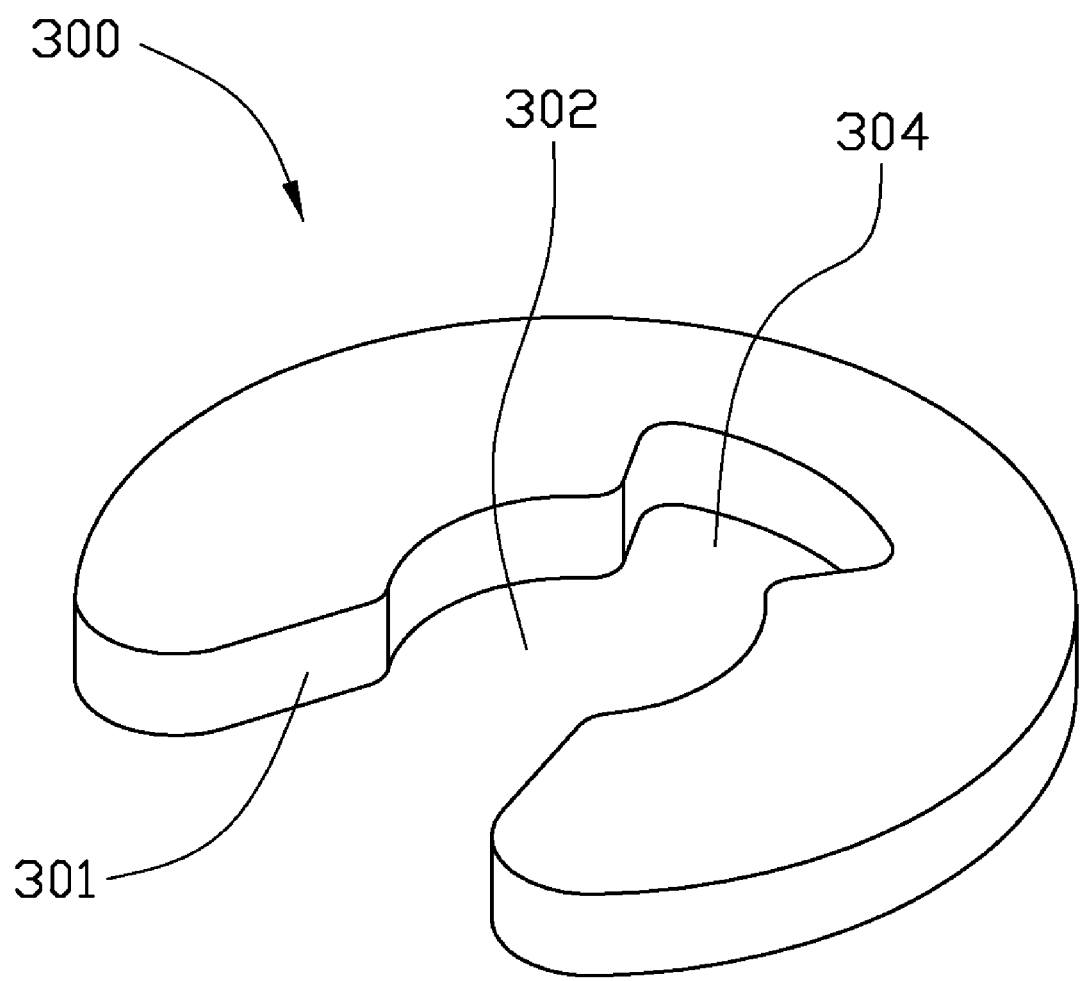
FIG. 4 is an enlarged, schematic view of another exemplary washer.

Referring to FIG. 4, the washer 300 is substantially C-shape, and defines an opening 301 at one side thereof. The washer 300 defines a through hole 302 at a central area. Adjacent to the through hole 302, the washer 300 according to this alternative embodiment defines a cutout 304. The cutout 304 is recessed from a central axis of the washer 300. The through hole 302 communicates the opening 301 with the cutout 304. The washer 300 has not only the advantage of the first embodiment of the washer 100, but also a good elastic characteristic. When the washer 300 is engaged in the main shaft 10, the position of the opening 301 is a force-bearing point. A portion of the washer 300 adjacent to the cutout 304 is thin in a radial direction, and is farthest to the force-bearing point. A distance from the force bearing point to the deformation point is arm of force. When the washer 300 is clamped in the ring groove 142 of the main shaft 10, the opening 301 will expand. Thus, washer 300 may allow larger deformations before failing.

It is to be understood that the elastic element may alternatively be made of other material (e.g. plastic or rubber). The elastic member may alternatively have a different configuration, for example, a leaf spring or a resilient cylinder.

It is believed that the present embodiments and their advantages will be understood from the foregoing description, and it will be apparent that different changes may be made thereto without departing from the spirit and scope of the invention or sacrificing all of its material advantages, the examples hereinbefore described merely being preferred or exemplary embodiments of the invention.

What is claimed is:

1. A washer for a hinge assembly, the washer defining an opening, a through hole for receiving cylindrical walls of a cylindrical shaft and a cutout for not receiving the cylindrical walls of the cylindrical shaft, the through hole, the opening, and the cutout communicating with each other, the opening defined at one side of the through hole, and the cutout defined at an opposite side of the through hole, portions of the washer surrounding the cutout having a smaller radial size than other portions of the washer to provide a large deformation.

2. A hinge assembly, comprising:
a main shaft including cylindrical walls;
a washer defining a through hole, an opening and a cutout communicating each other, the opening defined at one side of the through hole, and the cutout defined at an opposite side of the through hole, portions of the washer surrounding the cutout having a smaller radial size than other portions of the washer to provide a large deformation, the washer being placed around the main shaft, the through hole receiving the cylindrical walls of the main shaft, the cutout spaced from the cylindrical walls of the main shaft, the engagement between the main shaft and the washer being a clearance fit.

* * * * *